UNITED STATES PATENT OFFICE.

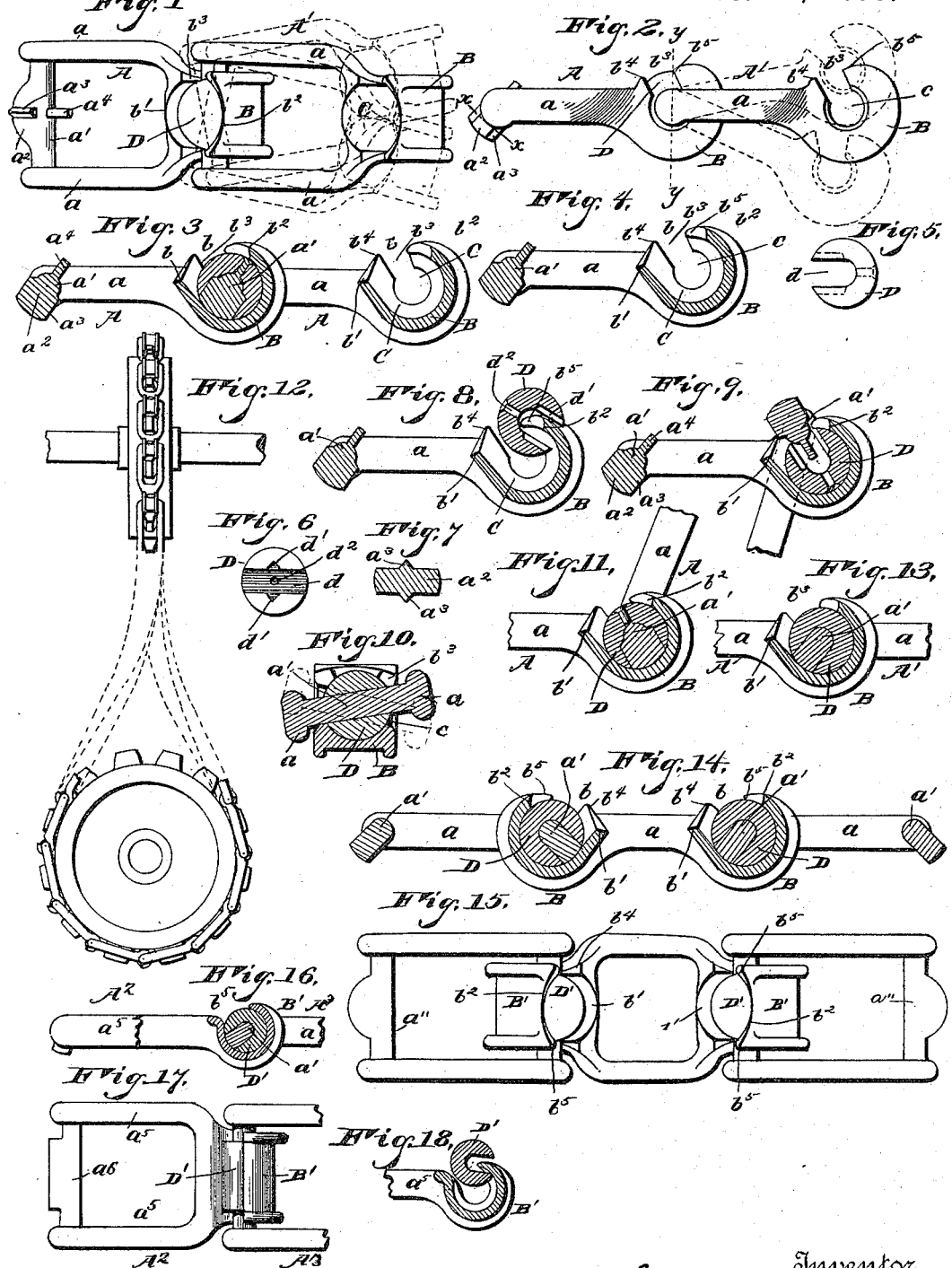

LYMAN D. HOWARD, OF PHILADELPHIA, PENNSYLVANIA, ASSIGNOR TO JOSEPH A. JEFFREY, OF COLUMBUS, OHIO.

CHAIN.

SPECIFICATION forming part of Letters Patent No. 572,991, dated December 15, 1896.

Application filed January 7, 1891. Serial No. 377,026. (No model.)

*To all whom it may concern:*

Be it known that I, LYMAN D. HOWARD, a citizen of the United States, residing at Philadelphia, in the county of Philadelphia and State of Pennsylvania, have invented certain new and useful Improvements in Sprocket-Chains, of which the following is a specification, reference being had therein to the accompanying drawings.

Figure 1 is a plan view of a portion of a chain sufficient to illustrate my invention. Fig. 2 is a side view of the same. Fig. 3 is a longitudinal central section of two adjacent links. Fig. 4 is a section of a link detached. Figs. 5 and 6 show the bushing detached. Fig. 7 is a section on line $x\ x$, Fig. 2. Fig. 8 shows the positions of parts at the time of inserting the bushing. Fig. 9 shows positions of parts when coupling or uncoupling two links. Fig. 10 is a section on line $y\ y$, Fig. 2. Fig. 11 shows the positions of two adjacent links opposite to that in Fig. 9. Fig. 12 illustrates the use of the chain in connecting to shafts at an angle to each other. Fig. 13 shows a modified end bar. Fig. 14 is a section, and Fig. 15 a plan, of modified links. Figs. 16 and 17 show a modified bushing. Fig. 18 illustrates the position of the bushing in Fig. 17.

In the drawings, A A' represent adjacent chain-links. These, as shown in Figs. 1 and 2, are adapted to be coupled and uncoupled at will. Each is formed with side bars $a\ a$ and with an end bar $a'$. These side bars and this end bar may be more or less like those in links of many of the ordinary forms. I prefer, however, to provide the end bar $a'$ with an extension of such nature that it can engage with a bushing to be hereinafter described. At the end of the link opposite to this bar $a'$ there is a socket preferably provided with a hook-like extension B. This, as shown in Figs. 1 and 2, is, as a whole, related to the link very much as are the hook-like extensions on the chain-links now in common use. At $b$ there is a passage preferably formed with a curvilinear edge at $b'$, a similar edge at $b^2$, and a relatively narrow throat at $b^3$, lying between the spurs or projections $b^4$ on the inside and the spurs or projections $b^5$ on the outside. At C there is a socket which approximates more or less a spherical shape. It is of a diameter greater than that of the passage $b$ and the throat at $b^3$.

At $c\ c$ there are openings in the side of the hook B, communicating with the enlarged interior socket and also with the throat $b^3$. The throat $b^3$ is of a diameter a little greater than that of the end bar $a'$.

D indicates a bushing adapted to be connected to the end bar $a'$ and to be fitted in the hook B. As shown in Figs. 1 and 2, it has a ball-like or spherical exterior surface of a diameter slightly less than that of the socket C. This bushing may be rigidly or detachably secured to the end bar. It is formed with a recess, groove, or seat at $d'$, (see Fig. 5,) which enables the bushing to be readily inserted into and withdrawn from the socket C, as will be explained, and which permits the attaching and detaching of an adjacent link.

The end bar $a'$ is preferably angular in section, as indicated by $a^2$ in the drawings, where it fits in the said groove or seat in the bushing, so that it will engage therewith and cause the bushing to move with it during the motions of articulation. The angular portion $a^2$ of the end bar is preferably provided on opposite sides with ribs $a^3$, substantially wedge or triangular shape in cross-section, which are adapted to fit in corresponding grooves in the seat in the bushing. The bushing, therefore, greatly enlarges the extent of wearing-surface and saves the end bar and the hook from the rapid wear which is incident to the ordinary chains of this class.

The manner of putting together the parts will be readily understood. The bushing B is first inserted into the socket by turning it in the position shown in Fig. 8, and then turning it downward until it is seated in the socket. Then the groove or recess is turned into the position shown in Fig. 9, and the link to be coupled is put into the position illustrated, whereupon it can be drawn down into the groove or recess in the bushing. When it is placed in line with the adjacent link, the end bar cannot escape from the bushing, because the recess in the latter is now turned downward, so as to bear against the inner part of the hook. Ordinarily these chains are so constructed that when coupling or uncoupling a link it is put in a position opposite to that herein shown, that is to say, has its hook turned up, so as to lie above the link. By having the groove in the bushing arranged as herein shown it is so situated when the links are in working position that there is a continuous bearing-surface for the bushing both on the front part and on the rear part of the hook, and yet the links can be readily detached whenever it is necessary.

In Figs. 13, 14, 16, 17, and 18 a cylindrical bushing is shown having these novel and peculiar features just referred to, that is, having the thrust-receiving surfaces continuous and practically uninterrupted by the groove or recess which receives the end bar of an adjacent link.

I am aware of the fact that cylindrical bushings have been used heretofore, and do not broadly claim them; but those within my knowledge have been arranged so that the opening at the edge of the recess was adjacent to the front or rear wall of the hook.

It will be seen that I accomplish a threefold purpose by constructing my links with a spherical bushing, as hereinbefore described. First, I am able to produce a chain which is flexible in all directions; second, I secure the end bars in the hooks against displacement, and, third, I insure that all the frictional wear comes upon the bushing which is placed between the end bar and the hook. The bushings are easily cast, and can be easily replaced when worn out.

In the chains heretofore used and of which I have knowledge the bushing was so placed that it did not serve to relieve the end bar from wear, but was merely a lock for the said end bar.

In Fig. 15 I have shown a modified form of the chain, in which each alternate link has a hook $B'$, and the intermediate ones have end bars $a''$, adapted to be secured in the bushings $D'$, fitted in the hooks $B'$, as before described.

When a bushing like that in Figs. 1 to 11 and links such as shown are used, the chain can be employed to connect shafts at an angle to each other and comparatively close together, as shown in Fig. 12. The end bars can rock in the hooks in three different directions.

As above said, the parts of the chain after being coupled can be made temporarily non-detachable. Thus pins $a^4$ can be formed on the end bar $a'$, and the bushing can be made with one or more apertures $d^2$ to receive the pin. When the end bar is being inserted into the bushing, as in Fig. 9, the pin enters said aperture, and then the link can be turned around, as shown in Fig. 11, at which time the pin can be hammered upon the end sufficiently to form a small rivet-head. After that the bar $a'$ and the bushing are safe against accidental detachment, and yet the links can be readily uncoupled after filing away or otherwise removing said small rivet-head.

What I claim is—

1. The combination with a chain-link having a socket with a relatively narrow transverse throat, and a spherical bushing adapted to be inserted in said socket through said throat when in a non-working position, and said bushing having a recess, of an adjacent link having an end bar adapted to be inserted in said recess through the said throat while its link is in a non-working position relative to the first link, whereby said end bar and said bushing are secured in said socket when the last aforesaid link is turned into working relation to the first link, substantially as set forth.

2. The combination with a chain-link having a socket as at C, of a bushing of substantially spherical shape detachably fitted in the socket and having a recess or seat for a bar, of a link having a cross-bar adapted to be seated in the said recess, and means for connecting the bar with the bushing whereby they are held from moving independently of each other, substantially as set forth.

3. The combination of the chain-link having the cross-bar formed with an extension $a^2$, angular in cross-section and lying in a plane transverse or inclined to the longitudinal plane of the chain-link, the detachable bushing having a throat or recess adapted to receive the said cross-bar and extension $a^2$, and a link provided with an open socket having lateral passages of greater diameter than that of said end bar, and a passage, as at $b$, for the insertion of the said bushing, substantially as set forth.

4. The combination with the chain-link having a hook with a spherical socket, a spherical bushing detachably fitting in said socket and having a recess, of an adjacent link having an end bar adapted to be seated in said recess, and a pin for securing said bar and said bushing together, substantially as set forth.

5. The combination with a chain-link having a socket, and a spherical bushing fitting detachably in said socket, and having a substantially U-shaped recess, of an adjacent link having an end bar adapted to be seated in said recess, said end bar lying normally in planes oblique to the longitudinal plane of the links, substantially as set forth.

In testimony whereof I affix my signature in presence of two witnesses.

LYMAN D. HOWARD.

Witnesses:
CHARLES W. MILLER,
WILLIAM F. GARRETT.